(No Model.)

C. W., J. & A. METTLER.
CAR SWITCH.

No. 557,592. Patented Apr. 7, 1896.

Witnesses
Scott H. Smith
E. J. Hyde

Inventors
Caspar W. Mettler,
Jacob Mettler, &
Adolf Mettler, by
Harry P. Williams,
atty.

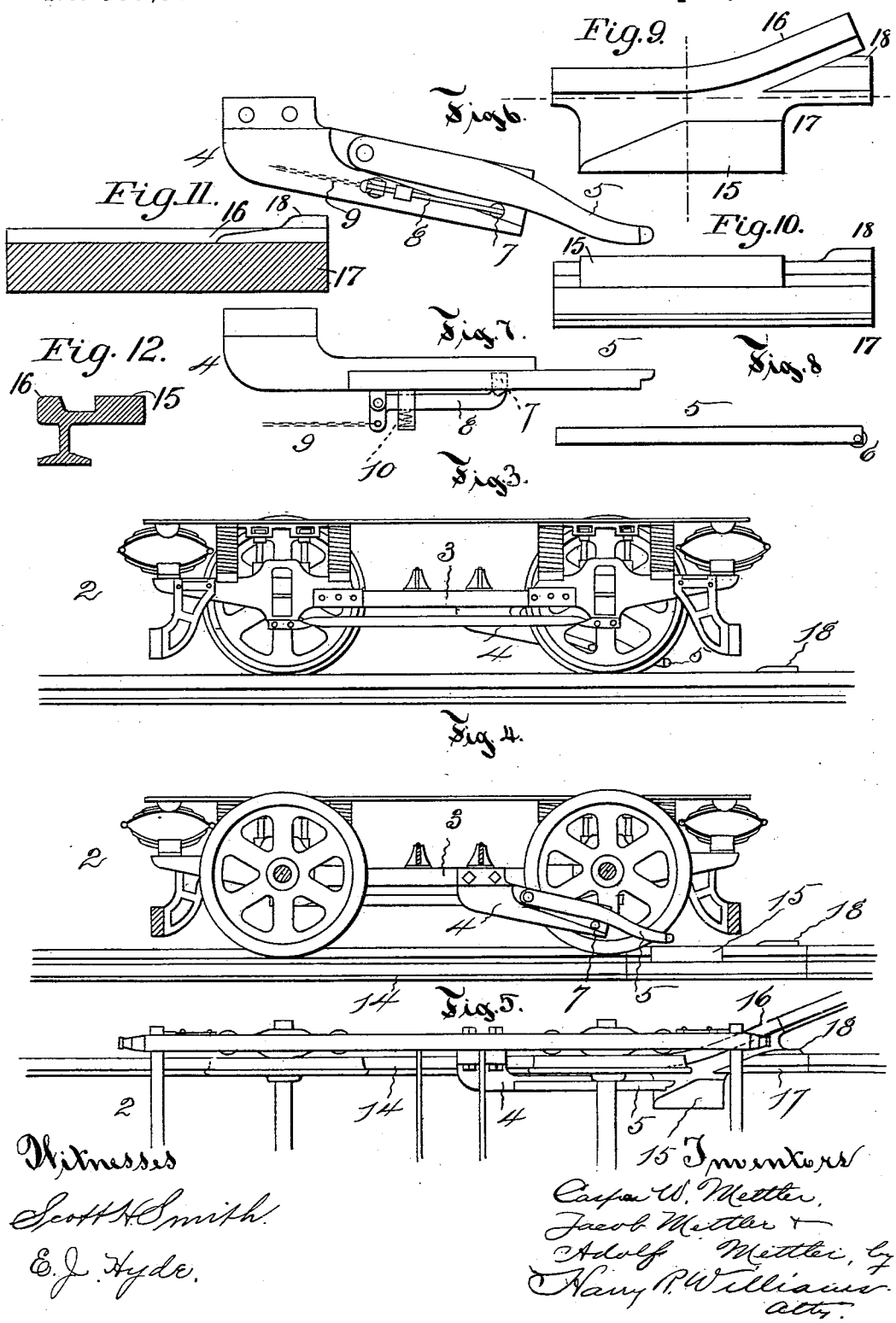

UNITED STATES PATENT OFFICE.

CASPAR W. METTLER, JACOB METTLER, AND ADOLF METTLER, OF HARTFORD, CONNECTICUT, ASSIGNORS TO THE HARTFORD AUTOMATIC SWITCH AND TRUCK COMPANY, OF SAME PLACE AND JERSEY CITY, NEW JERSEY.

CAR-SWITCH.

SPECIFICATION forming part of Letters Patent No. 557,592, dated April 7, 1896.

Application filed May 17, 1895. Serial No. 549,673. (No model.)

*To all whom it may concern:*

Be it known that we, CASPAR W. METTLER, a citizen of the United States, and JACOB METTLER and ADOLF METTLER, citizens of Switzerland, all residing at Hartford, in the county of Hartford and State of Connecticut, have invented certain new and useful Improvements in Car-Switchers, of which the following is a specification.

The invention relates to the class of devices employed for directing cars from one track to another; and the object of the invention is to provide a simple, cheap, and positive device that can be readily attached to any car, that is easily controlled, and that can be set so that the car to which it is applied can be run on the main track or on a switch or branch as desired; and a further object is to so arrange the device that when the car has once been run on a branch or switch the mechanism will automatically readjust itself and the car will continue on that line of track and not switch off until the mechanism is again set.

Figure 1:
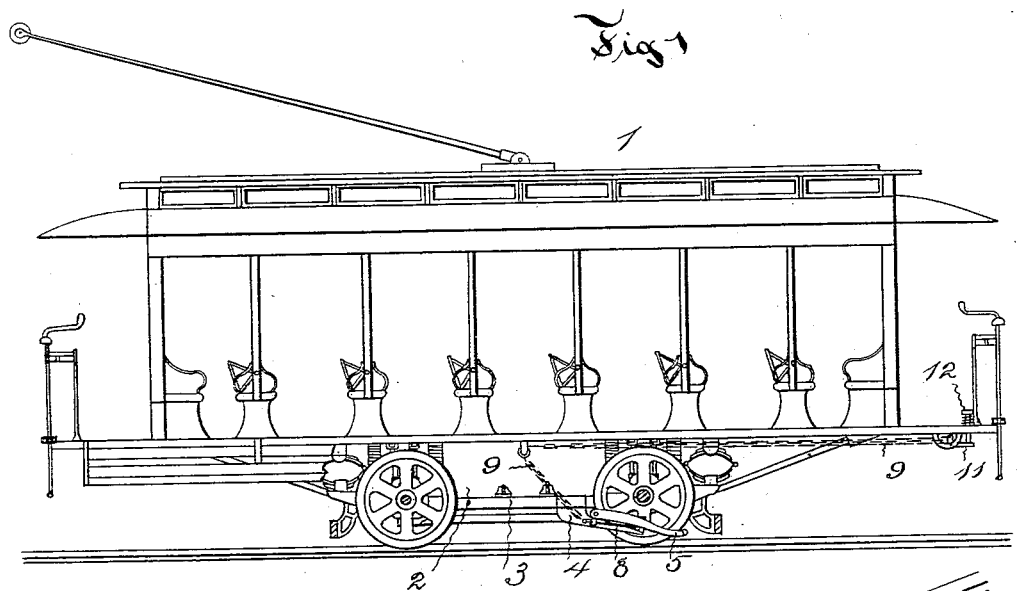
Figure 2:
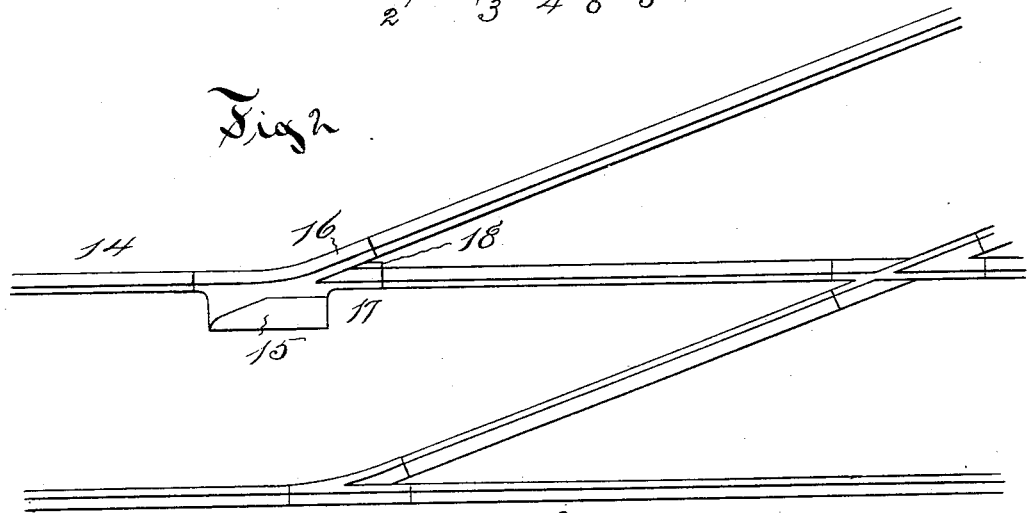

Referring to the accompanying drawings, in which one form of the invention is illustrated, Figure 1 is a side elevation of a car provided with the invention. Fig. 2 is a view of a section of track at a switch or where a branch leads off, arranged for use in connection with this invention. Fig. 3 is an enlarged elevation of the truck of the car. Fig. 4 is a section through the same truck, showing the location of the switching device. Fig. 5 is a plan of a portion of the truck and the wheels on one side. Fig. 6 is a detail side elevation of the switch device. Fig. 7 is a plan of the same, and Fig. 8 is a view of the end of a switch-bar of modified form. Fig. 9 is a plan of the frog. Fig. 10 is an edge view of the same. Fig. 11 is a longitudinal section of the same, and Fig. 12 is a transverse section.

In the views, 1 indicates a car of common construction which is mounted on any form of truck 2. This car may, of course, be either open, closed, or vestibule, and it may utilize horses, steam, cable, electricity, or any other means as motive power. The car shown is one of the so-called "open" trolley-cars and the truck has four wheels; but the invention is equally applicable to cars having trucks with a greater number of wheels. Secured by bolts or otherwise to the inner side of one of the side bars 3 of the frame of the truck, preferably just back of one of the front wheels, is a support 4, and connected with this support, which may be a cast-metal plate of suitable shape, is a movable bar 5. This bar is arranged so that it may be given a movement when desired, and usually the plate is recessed or mortised to receive and guide the bar in its movement. In the form shown this plate projects inwardly from the truck-frame and then extends forward on the inside of the wheel to which it is adjacent, so close as to bear against the rim when the bar makes contact with the switch-wedge and is subjected to sidewise pressure, for of course the car-trucks have more or less sidewise play on the axles, and when the bar makes contact with the switch-wedge the truck will be crowded over or moved on the axle sufficiently for this purpose.

The inside of the plate shown is milled off and the bar is pivoted near one end to the wall of this milled portion of the plate. The other end of this bar projects toward the track beyond the support to a position somewhat in advance of the point of contact of the forward wheel and the rail on which it runs. The lower or point end of this bar is preferably shoe-shaped or somewhat rounded, so that it will ride over any small obstructions, and it may, if desired, be provided with an antifriction-wheel 6, as shown in Fig. 8.

The bar is normally held in a raised position, as shown in the views, by means of a spring-pin or other catch. The catch illustrated consists of a pin 7 that passes under the lower edge of a portion of the bar, the pin being connected with an angle-lever 8 that is adapted to be pulled in one direction by means of a chain 9 and that is thrust in the other direction by means of a spring 10. When the bar is lifted, the pin is thrust beneath by the spring so that the bar cannot drop down; but when the chain or other connection is utilized to operate the catch the pin is withdrawn and the bar can then drop to its lower position. The chain or similar connection may lead from the catch to a location convenient to the driver, motorman, or conductor. In Fig. 1 the chain is shown as passing around a pulley and beneath the car-floor to an angle-lever 11 attached to the under side of the front platform of the car, which lever is adapted to be oscillated by the pressure of the foot of the motorman or driver on the pedal 12 when it is desired to release the catch. By means of this arrangement the bar that is movably held by the support attached to the truck is normally retained in a raised position by the catch; but when the catch is released by the motorman or other attendant on the car, through the medium of the chain or other connection, the bar drops down so that its lower or point end is preferably just a little below the level of the tread of the rail.

At the switch or where the track branches off one rail 13 may be left straight, as it would be along the main track, while the other rail 14 is cut so that the wheels can pass from the main track onto the branch. Between the rails and adjacent to the portion of the rail 14 where it is first cut and where the branch curves off is located a wedge or guide block 15. This block, which may be made a part of the frog and connected with the sections 16 and 17 of the track, is so shaped and located as to lie in the path of the end of the movable bar connected with the car when that bar is in its lowest position. The bar in its normal raised position passes freely over this wedge-block, and then the car has no tendency to turn off, but travels along the straight track in the usual way; but when this bar is in its lowest position it makes contact with this block in such manner as to be wedged sidewise, and this forces the wheels of the car sidewise and causes them to follow around the bend of the track and run upon the branch.

After the car has been guided upon the branch as it moves along the end of the bar rides over an upward-projecting ridge or lug 18 that is preferably cast integral with the outside of the section 17 of the track. This projection extends upward, so as to lift the bar and permit the spring-catch to again engage and hold it in its upper position ready to be released by the motorman or other attendant when another switch or branch is reached that it is desired to turn.

The point of the frog or bar of the switch is usually more or less tapering or inclined, so that when the rounded end of the bar passes the wedge it rides up without striking the point of the frog.

A car fitted with this device, which is simple, cheap, and positive in its action, will always run on the main track as long as the movable bar is held raised; but if it is desired to turn onto a switch or branch track the motorman or other attendant, at any time before reaching the switch or branch, can release the catch, so that the bar will drop down, and when the wedge is reached the car will be forced to make the turn. The handle or pedal for the connection from the catch can be conveniently located, so that the motorman can operate it without interfering with his other duties, and the device can be set at any time before the car reaches the switch or branch to be turned. After the switch has been passed the bar is so lifted that the car will run straight and not turn any more until the bar has again been let down.

This device obviates the necessity of a movable part in a track which is required to be kept free from ice and dirt, and it overcomes the necessity of having a special switchman or the stopping of a car while the switch is being turned by one of the attendants. When the switching-bar is held up in its normal position and the track is arranged as shown in the views, the car will always take the track to the right; but when the bar is let down the car will always take the track to the left, so that if the branches are constructed in this manner it is only necessary to have a switching-bar on one side of the car for one rail.

We claim as our invention—

1. In combination with the lower part of a car, a support attached to the car-truck back of the front wheel, a movable bar with one end held by the support back of the front wheel and with the other or free end, one side of which is adapted to make contact with a stationary wedge-block, located forward of but adjacent to one of the front wheels of the car, said bar having a free upward movement and being braced against sidewise thrust by the support for a considerable portion of its length, and connections leading from the bar to a position within convenient reach of a person on the car so that the position of the end of the bar may be changed, substantially as specified.

2. In combination with the lower part of a car, a support attached to the car, a movable bar held by the support with an end located adjacent to one of the front wheels of the car, a catch adapted to engage the bar, and connections leading from the catch to a position within reach of a person on the car for operating the catch, substantially as specified.

3. In combination with the lower part of a car, a support secured to the truck back of the front wheel but adapted to bear against the rim of the wheel, a movable bar held by the support back of the front wheel with a free end extending forward of the front wheel, said bar being braced against sidewise thrust for a considerable portion of its length, and a connection leading from the bar to a position within reach of a person on the car, substantially as specified.

4. In combination with the lower part of a car, a support secured to the truck back of the front wheel but adapted to bear against the rim of the wheel, a recess in said support, a bar located in said recess and pivoted to the support so as to be braced against sidewise thrust for a considerable portion of its length with a free end extending forward of the front wheel, and a connection leading from the bar to a position within reach of a person on the car, substantially as specified.

5. In combination with the lower part of a car, a support secured to the truck, a bar pivoted to the support back of the front wheel with a free end having one side adapted to make contact with the stationary wedge-block extending forward of the front wheel, said bar being braced against sidewise thrust by the support for a considerable portion of its length and said bar having a free upward movement, a catch for retaining the bar in its upper position, and a connection leading from the catch to a position within reach of a person on the car, substantially as specified.

6. In combination with the lower part of a car, a support secured to the truck, a bar pivoted to the support, a pin adapted to be thrust beneath the bar for holding it in a raised position, a lever for withdrawing the pin, and a connection between the lever and the platform of the car, substantially as specified.

7. In combination with the lower part of a car, a support secured to the truck back of the forward wheels, a bar pivoted to the support, a pin adapted to be thrust beneath the bar for holding it in a raised position, and a flexible connection between the pin and the platform of the car, substantially as specified.

8. In combination with a car-truck, a support attached to the truck back of the front wheel, a bar having a free upward movement hinged to the support back of the front wheel and with the free end, one side of which is adapted to make contact with a stationary wedge-block, located forward of but adjacent to one of the front wheels of the car, said bar being braced against sidewise thrust forward of the hinging-pivot, and connections leading from the bar to a position within convenient reach of a person on the car so that the position of the end of the bar may be changed, substantially as specified.

CASPAR W. METTLER.
JACOB METTLER.
ADOLF METTLER.

Witnesses:
H. R. WILLIAMS,
SCOTT H. SMITH.